United States Patent Office 2,694,624
Patented Nov. 16, 1954

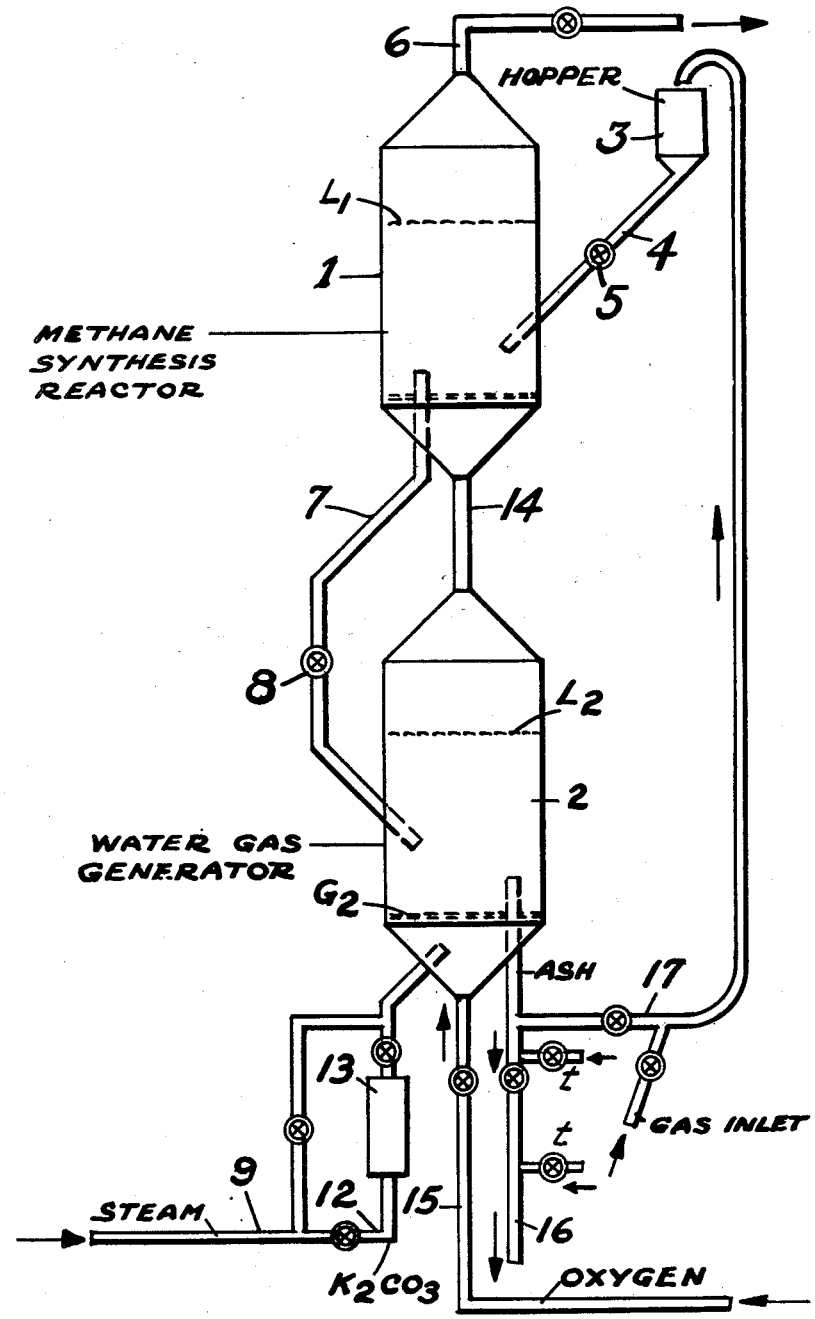

2,694,624

PRODUCTION OF GAS OF HIGH CALORIFIC VALUE

Sumner B. Sweetser, Cranford, N. J., assignor to Standard Oil Development Company, a corporation of Delaware Application June 23, 1949, Serial No. 100,846

10 Claims. (Cl. 48—197)

The present invention relates to improvements in the art of carbonizing and gasifying coal and, in particular, relates to a method of forming a city gas of improved heating value.

Prior to this invention it was known that carbonaceous material such as coal, when subjected to the influence of steam at high temperatures, was adapted to generate volatile constituents suitable for use as a fuel and which contained not only hydrogen and carbon monoxide but also methane, the methane being present in greater quantity in the fuel than that corresponding simply to the methane produced by destructive distillation of the coal. In other words, at least a portion of the carbon monoxide and hydrogen reacted to form methane. This process has been practiced abroad commercially and is generally referred to as the Lurgi process.

The present invention constitutes an improvement over the older process in several particulars, including the employment of the fluid solids technique, the use of at least two vessels, and the use of a promoted catalyst to catalyze the reduction by hydrogen of the oxides of carbon to form methane.

The main object of the present invention, therefore, is to produce a fuel gas of improved heating value in a process which is more economical, more flexible, and in particular which results in the formation of a fuel gas of increased heating value due to the presence of increased quantities of methane.

Another object of the present invention is to carry out continuously, a treatment of coal or coke in a two-zone system so operated that the generation of hydrogen and carbon monoxide is carried out in a zone physically separated from a second zone in which methane synthesis occurs. Another object of the present invention is to take advantage of the exothermic character of the reaction in the methane synthesis zone to heat the carbonaceous material to be charged to the water gas generation zone. Another object of the present invention is to carry out the methane synthesis in a process of the character indicated in the presence of a catalyst which contains an activator or promoter thus increasing the quantity of methane formed per mol each of hydrogen and carbon monoxide available in the synthesis zone.

Other and further objects of the invention will appear in the following more detailed description and claims.

In a co-pending application, "Improved Process for Enrichment of Water Gas," filed in the name of Albert B. Welty, Jr., and Sumner B. Sweetser, Serial No. 93,208, filed May 14, 1949, there is described a two-zone system for manufacturing city gas of high B. t. u. value which involves the concept of reacting the hydrogen and carbon monoxide formed by the water gas reaction under methane synthesis conditions in the presence of a catalyst.

Before proceeding with a detailed description of the process and the preferred embodiment thereof, it should be pointed out that heretofore it has been demonstrated that water gas can be generated from coal or coke by contacting it with steam while the said coal or coke is in the form of a fluidized mass. The gas thus produced, however, has a relatively low B. t. u. value, generally of the order of about 300 B. t. u. per cubic foot. Such gas is suitable as a hydrocarbon synthesis feed gas, but is of too low quality for use as a city gas since the latter should possess a much higher B. t. u. value.

It has previously been found that the heating value of the water gas thus produced can be increased by contacting the hot gas as it issues from a water gas generating zone with incoming coal or coke, both of which are fed to a carbonizing zone and synthesis zone maintained at a temperature of 1000° to 1500° F., and under superatmospheric pressure. Under these conditions, methane is synthesized by contact of the carbon monoxide and hydrogen in the water gas with the coal or coke. In such an operation the incoming coal or coke feed contacts the water gas in the synthesis zone in which the coal or coke is formed into a fluidized mass. The solid carbonaceous feed of this zone then passes into the water gas generating zone where it is again procured in fluidized form and wherein the water gas is synthesized by the reaction of steam with the carbonaceous material at a temperature of about 1800° F. or any known suitable temperature. In order to support the endothermic reaction occurring in this latter zone, oxygen is also fed into the zone, causing combustion of a portion of the carbonaceous material and the release of heat. Ash of relatively low carbon content is withdrawn from a lower portion of the water gas generation zone and this may be rejected from the system, or the sensible heat may be utilized in any known manner.

It has now been found that increased yields of methane can be obtained in the product gas by including in the coal or coke fed to the carbonization and methane synthesis zone, relatively small amounts of catalyst adapted to catalyze the methane synthesis.

In the accompanying drawing there is shown diagrammatically, a two-vessel system operating in both vessels on the fluid solids technique in which a preferred modification of the invention may be carried into effect.

Referring in detail to the drawing, 1 represents a methane synthesis and carbonization reactor and 2 a water gas set. The carbonaceous material and iron ore or other suitable catalytic materials are charged to vessel 1 from a supply hopper 3 through an aerated standpipe 4 carrying a control valve 5. Since the system is to operate under pressure, it should be provided either with a series of pressurized feed hoppers or a plurality of standpipes operating in series. Since these devices are known, it is deemed unnecessary to show them in the drawing. The coal or coke and iron ore are in a powdered form having a particle size ranging within the approximate limits of from 40 to 400 microns. The mixture of coal or coke and iron ore is formed into a fluidized mass in methane synthesis reactor 1 by causing gas, principally water gas, to flow upwardly from the bottom of vessel 1 through a distribution means such as grid or screen G into the fluidized mass at a superficial velocity within the range of from about ½ to 5 feet per second. Superficial velocity may be defined as the velocity of the feed gases at the inlet end of the reactor, assuming that no volume is occupied by the fluidized solids. Depending upon the velocity and the actual amount of carbonaceous material or iron ore in the reactor, the fluidized mass will have an upper dense phase level at $L_1$.

The methane synthesis is catalyzed by the use of an oxide of iron. It is preferred to use a cheap form of oxide such as an iron ore, for example, magnetite or hematite, but more refined materials such as precipitated iron oxide may be used, if desired. It has been found that improved results are obtained by adding to the iron oxide catalyst a promoter which may be an alkali metal compound such as an oxide, carbonate or hydroxide. The method of addition of the promoter to the catalyst is an essential feature of the invention and will be described in more detail hereinafter.

The reaction of carbon monoxide and hydrogen to form methane is exothermic and cooling means not shown may be provided in vessel 1 to afford additional cooling over that effected by the incoming carbonaceous feed.

In cases where coal is used in place of coke as the carbonaceous feed for the process, carbonization of the coal is effected in vessel 1 in addition to the synthesis of methane. The carbonization of the coal results in the production of coal gas which enriches the water gas and thereby gives a product gas of higher calorific value than when coke is used as feed.

The product gas is withdrawn overhead through line 6 from which it is delivered to storage, usually after removal of $CO_2$ by any conventional method such as scrubbing with, say, an alkaline aqueous medium. It will be understood, of course, that prior to withdrawing the product gas from the reactor 1, it may be desirable to remove entrained solids therefrom by causing the said exiting gas to flow through one or more centrifugal separators (not shown) disposed either within or without the reactor. The product gas may be scrubbed with water or other suitable solvents to remove carbon dioxide from the gas and thereby increase the calorific value of the product.

The residue remaining after the synthesis reaction is withdrawn from vessel 1 through an aerated standpipe 7, carrying flow control valve 8, and discharged into water gas set 2.

Vessel 2, as shown in the drawing, may be of the same general size and construction as vessel 1. Here also, the solids are formed into a fluidized mass by causing a gasiform material to flow upwardly therethrough at about the same velocity as indicated for the gasiform material in vessel 1. The result of the fluidizing gas is to form here also, a mass of fluidized solids having an upper dense phase level L2, depending again on the gas velocity and the actual amount of solids in the reactor. The fluidizing gas here is principally steam which is introduced to the present system through a line 9, thence forced through a receptacle 13, containing $K_2CO_3$ or other potassium compound, and thence into the bottom of the reactor 2 below a foraminous member-G2, similar to that indicated at G in vessel 1. In the case where KOH is employed as the catalyst, merely a portion of the steam stream need be forced through receptacle 13. The passage of the steam through the container 13 results in the acquisition by the said steam of a portion of the potassium carbonate or other activator, and its introduction with the steam into the fluidized mass of solids in generator 2. The quantity of activator fed may be from 0.005 to 1.0% by weight of the carbonaceous material fed to vessel 1. Because of the high surface area of the coke in gasification vessel 2, the activator is adsorbed on the coke and thereby catalyzes the reaction of the carbon in the coke with steam to produce carbon monoxide and hydrogen, whereby a higher conversion is obtained at a given temperature or the same conversion may be obtained at a lower temperature. Another method of introducing the potassium compound involves dissolving the said compound in water and injecting the solution into the feed steam. Various other methods for introducing the potassium catalyst may be used.

In spite of the tendency of the vaporized promoter to be adsorbed on the coke in water gas generator 2, the promoter, or its decomposition products, such as the oxide, has an appreciable vapor pressure at water gas generating temperatures and it is gradually carried overhead with the water gas into methane synthesis reactor 1 where it promotes the catalytic properties of the iron for the formation of methane from carbon monoxide and hydrogen so that the synthesis occurs to a greater degree than if the promoter were not present. Thus, the same material is used to catalyze the reaction of carbon with steam and to promote the catalyst for the reaction of carbon monoxide and hydrogen to form methane.

Referring again to vessel 2, since the water gas reaction is dependent on a supply of heat for its maintenance, it may be necessary and usually is, to inject commercially pure oxygen from some source via line 15 into the bottom of vessel 2, and thereafter with steam into the water gas generator proper. The presence of the oxygen causes, of course, combustion of a portion of the carbonaceous solids, releasing heat. Another portion of the heat, of course, is supplied by the introduction of hot solids via line 7 from vessel 1 into vessel 2.

Ash formed in the process may be withdrawn from water gas generator 2 through an aerated draw-off pipe 16 carrying gas taps $t$. This hot ash may be employed in any known manner to recover its sensibile heat in equipment not shown.

Part of the ash, which is now enriched in both iron oxide and the promoter or its decomposition products, may be recycled to feed hopper 3 by a gas lift 17 or other suitable means and the remainder is rejected from the system.

Therefore, as indicated, the present process is one in which a city gas of high B. t. u. value up to about 700 B. t. u. per cubic foot may be thus formed. Normally, water gas has a B. t. u. value of around 300 B. t. u.'s per cubic foot. The process described herein has many valuable attributes in addition to the fact that it results in the preparation of a superior fuel gas from the standpoint of heating value. For instance, it may be operated continuously. Second, coal or coke may be preheated in the synthesis zone, a zone which is highly exothermic, and the hot coke residue may be then directly charged into the water gas generation zone thus providing at least a portion of the heat necessary to sustain the latter reaction. In addition, all of the valuable attributes of fluid solids technique are incidents of the present process. The use of a promoter for the synthesis such as a potassium compound serves a double purpose not only of promoting the synthesis of methane but also of promoting the water gas reaction, making it possible to carry out the latter at a lower temperature.

In order to show the effect of including $K_2CO_3$ in the steam feed to the water gas generator, the following is set forth: (The below results are based on the results attainable per foot of diameter where the bed depth in the water gas generator is 25 feet and that in the methane synthesis zone is 28 feet.)

Basis—A generator 1 foot in diameter.
Generator (water gas):
  Catalyst $K_2CO_3$ _____ [1] 0.65
    Temp., °F _____ 1800
    P. s. i. g _____ 250
    Steam, SCFH _____ 7840
    $O_2$ _____ 3360
  Superficial Vel. in ft. per sec _____ 0.75
  Bed depth _____ 25
  Bed density in lbs. per cubic foot _____ 20
  Steam conversion, per cent _____ 80
  Product analysis:
    $CO_2$ _____ 16.0
    CO _____ 40.5
    $H_2$ _____ 43.0
    $CH_4$ _____ 0.5
  Ash withdrawn, lbs./hr _____ 88
  Carbon in ash, per cent _____ 20
  Total exit gas SCFH (Ex steam) _____ 18,600
Methane synthesis:
  Reactor cross section, sq. ft _____ 1.32
    Pressure, p. s. i. g _____ 250
    Temperature, °F _____ 1200
    Super. vel. in ft./sec _____ 0.75
    Bed depth in feet _____ 28
    Feed+catalyst rate, lb./hr _____ 424
  Feed+catalyst analysis:
    Carbon _____ 83.5
    Ash _____ 14.5
    Magnetite _____ 2.0
  Product gas, SCFH _____ 14,400
  Product gas analysis:
    $CO_2$ _____ 22
    CO _____ 22
    $H_2$ _____ 27
    $CH_4$ _____ 28
    $C_2$ _____ 1
  Heating value raw gas, B. t. u./C. F _____ 417
  Heating value scrubbed gas ($CO_2$ removed) B. t. u./C. F _____ 535

[1] Pounds per hour added to generator.

Obviously, the foregoing example is merely illustrative and changes in the details may be made by those skilled in this art without departing from the spirit of the invention.

As to operating conditions, the following are set forth for both zones with the understanding, however, that the precise details as set forth therein are merely illustrative and do not impose any limitation on the invention.

| | Methane Synthesis Zone | Water Gas Generation Zone |
|---|---|---|
| Pressure, p. s. i. g | 100–600 | 100–600. |
| Temperature, °F | 900–1,500 | 1,500–2,000. |
| Catalyst | Fe | $K_2O$ or $K_2CO_3$. |
| Promoter | $K_2O$ or $K_2CO_3$ | None. |
| Amount of Catalyst, wt. percent | 0.5–5 | 0.005–1.0. |
| Contact Time in Seconds | 5–50 | 5–50. |
| Super. Vel. of Gasiform Material, ft./sec. | 0.5–5.0 | 0.5–5.00. |
| Particle Size of Solids | 40–400 microns | 40–400 microns. |
| Carbon Concentration | 60–85 wt. percent | 5–20 wt. percent. |

The calorific value of the gas recovered from the methane synthesis zone is of the order of 500–700 B. t. u./C. F.

Numerous modifications of the invention not specifically mentioned herein will suggest themselves to those who are familiar with this art without departing from the spirit thereof.

What is claimed is:

1. A continuous process for producing a fuel gas of improved heating value which comprises charging powdered carbonaceous solids and an iron oxide catalytic material to a carbonizing and methane synthesis zone, procuring said materials in the form of a fluidized mass, contacting said materials with a gas containing hydrogen, carbon monoxide and a volatilized alkali metal compound, under conditions suitable for carbonization and synthesizing methane from carbon monoxide and hydrogen, for a sufficient period of time to cause the desired conversions, withdrawing carbonaceous solids and iron oxide catalytic material from the methane synthesis and carbonizing zone and charging them to a water gas generation zone, procuring said solids in said water gas generation zone in the form of a fluidized mass, charging steam, oxygen and a water gas reaction catalyst consisting of one of the class consisting of an alkali metal oxide and an alkali metal carbonate at least partially vaporizable to said water gas generation zone, maintaining said water gas generation zone at water gas generation temperatures, permitting contact between the steam, the oxygen and the carbonaceous solids, in the presence of said catalyst, for a sufficient period of time to effect the desired conversion, withdrawing volatilized water gas catalyst and products of the water gas reaction containing carbon monoxide and hydrogen from said water gas generation zone, charging said withdrawn materials directly to the carbonizing and methane synthesis zone, recovering from last named zone a gaseous fuel containing CO, $H_2$ and methane, and discharging from said water gas reaction zone an ash containing unreacted carbon, iron oxide and unvolatilized alkali metal compound.

2. The method set forth in claim 1 in which the iron oxide is an oxidic iron ore.

3. The method set forth in claim 1 in which the alkali metal compound added to the carbonizing and methane sythesis zone by volatilization from the water gas generation zone is $K_2O$.

4. The method set forth in claim 1 in which a portion of the ash discharged from the water gas reaction zone is recycled to the carbonizing and methane synthesis zone.

5. The method set forth in claim 1 in which the alkali metal compound added to the carbonizing and methane synthesis zone by volatilization from the water gas generation zone is $K_2CO_3$.

6. A continuous process for producing a fuel gas of improved heating value which comprises charging powdered coal and an iron oxide catalytic material to a carbonizing and methane synthesis zone, procuring said materials in the form of a fluidized mass, contacting said materials with a gas containing hydrogen, carbon monoxide, and a volatilized alkali metal compound under conditions suitable for carbonization and synthesizing methane from carbon monoxide and hydrogen, for a sufficient period of time to cause the desired conversions, withdrawing carbonized coal and iron oxide catalytic material from the methane synthesis and carbonizing zone and charging them to a water gas generation zone, procuring said carbonized coal in said water gas generation zone in the form of a fluidized mass, charging steam, oxygen, and a water gas reaction catalyst consisting of one of the class consisting of an alkali metal oxide and an alkali metal carbonate, at least partially vaporizable to said water gas generation zone, maintaining said water gas generation zone at water gas generation temperatures, permitting contact between the steam, the oxygen, and the carbonized coal, in the presence of said catalyst, for a sufficient period of time to effect the desired conversion, withdrawing volatilized water gas catalyst and products of the water gas reaction containing carbon monoxide and hydrogen from said water gas generation zone, charging said withdrawn materials directly to the carbonizing and methane synthesis zone, recovering from the last named zone a gaseous fuel containing CO, $H_2$ and methane, and discharging from said water gas reaction zone an ash containing unreacted carbon iron oxide, and unvolatilized alkali metal compound.

7. The method set forth in claim 6 in which the iron oxide is an oxidic ore.

8. The method set forth in claim 6 in which the alkali metal compound in the carbonizing and methane synthesis zone by volatilizaion from the water gas generation zone is $K_2O$.

9. The method set forth in claim 6 in which a portion of the ash discharged from the water gas reaction zone is recycled to the carbonizing and methane synthesis zone.

10. The method set forth in claim 6 in which the alkali metal compound added to the carbonizing and methane synthesis zone by volatilization from the water gas generation zone is $K_2CO_3$.

References Cited in the file of this patent

UNITED STATES PATENTS

| Number | Name | Date |
|---|---|---|
| 1,898,967 | Schneider et al. | Feb. 21, 1933 |
| 2,094,964 | Hubmann | Oct. 5, 1937 |
| 2,428,624 | Holder | Oct. 7, 1947 |
| 2,609,283 | Kalbach | Sept. 2, 1952 |

FOREIGN PATENTS

| Number | Country | Date |
|---|---|---|
| 503,158 | Great Britain | Apr. 3, 1939 |
| 514,302 | Great Britain | Nov. 6, 1939 |